US 9,230,244 B2

(12) United States Patent
Patil et al.

(10) Patent No.: US 9,230,244 B2
(45) Date of Patent: Jan. 5, 2016

(54) RECIPIENT CHANGES IN EMAIL THREADS

(75) Inventors: Sandeep R. Patil, Pune (IN); Sri Ramanathan, Lutz, FL (US); Vikram B. Sanap, Maharashtra (IN); Gandhi Sivakumar, Bentleigh (AU); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 13/433,832

(22) Filed: Mar. 29, 2012

(65) Prior Publication Data
US 2013/0262590 A1 Oct. 3, 2013

(51) Int. Cl.
G06F 15/16 (2006.01)
G06Q 10/10 (2012.01)
H04L 12/58 (2006.01)

(52) U.S. Cl.
CPC ............ *G06Q 10/107* (2013.01); *H04L 51/24* (2013.01)

(58) Field of Classification Search
None
See application file for complete search history.

(56) References Cited

U.S. PATENT DOCUMENTS

| | | | |
|---|---|---|---|
| 6,823,368 B1 | 11/2004 | Ullmann et al. | |
| 7,222,156 B2 | 5/2007 | Gupta et al. | |
| 7,275,214 B2 | 9/2007 | Itoh | |
| 7,930,356 B2 | 4/2011 | Gawor et al. | |
| 7,933,957 B2 | 4/2011 | Daniell | |
| 7,949,717 B2 | 5/2011 | Pastorelli et al. | |
| 8,521,822 B2 * | 8/2013 | Tu ................................ | 709/206 |
| 2005/0108402 A1 * | 5/2005 | Colson et al. ................. | 709/227 |
| 2007/0073871 A1 | 3/2007 | Adams et al. | |
| 2007/0250588 A1 | 10/2007 | Hogan et al. | |
| 2008/0294730 A1 | 11/2008 | Oral et al. | |
| 2009/0049140 A1 | 2/2009 | Stoddard et al. | |
| 2009/0064339 A1 | 3/2009 | Denner et al. | |
| 2009/0100183 A1 | 4/2009 | Lam et al. | |
| 2010/0070592 A1 | 3/2010 | Steuer et al. | |
| 2010/0088377 A1 | 4/2010 | Johnson et al. | |
| 2010/0138754 A1 | 6/2010 | Wilson et al. | |
| 2010/0293475 A1 | 11/2010 | Nottingham et al. | |
| 2011/0126126 A1 | 5/2011 | Blair | |
| 2012/0131474 A1 * | 5/2012 | Panchadsaram et al. ..... | 715/752 |

OTHER PUBLICATIONS

Venolia et al., "Understanding Sequence and Reply Relationships with Email Conversations: A Mixed Model Visualization," CHI '03: Proceedings of the SIGCHI conference on Human factors in computing systems, Apr. 2003, pp. 361-368, vol. 5, Issue No. 1, ACM, USA, doi: 10.1145/642611.642674.

Yeh et al., "Email Thread Reassembly Using Similarity Matching," CEAS 2006—Third Conference on Email and Anti-Spam, Jul. 27-28, 2006, Mountain View, CA, USA, <http://www.ceas.cc/200617.pdf>.

* cited by examiner

*Primary Examiner* — John B Walsh
(74) *Attorney, Agent, or Firm* — Alexander Jochym; Nicholas L. Cadmus

(57) ABSTRACT

A tool for notifying a recipient of an email message, belonging to an email thread, that a recipient address has been added to or dropped from the thread. Address fields of the email message received are compared to the address fields of the most recent prior email message in the thread. Addressed that are determined to be added or dropped are stored in the metadata of the email message received so the added or dropped recipient addresses can be accessed to notify recipients of subsequent emails in the email thread. The metadata of previous email messages in the email thread are accessed to notify the recipient of recipient addresses added or dropped between any two consecutive email messages in the thread.

20 Claims, 4 Drawing Sheets

220 — From: Elizabeth Smith (Beth) <ESmith@somecorp.com>
To: Williams Jones (Bill) <WJones@somecorp.com>
Cc:
Sent: Friday, February 03, 2012 10:54 AM
Subject: Re-Drawings Nicholas Taylor (Nick) <NTaylor@somecorp.com> was dropped from this thread — 270

Hi Bill,

210 — Please find attached edits for the drawings.

We'll be out of the office this afternoon. If you have any questions please contact Nick or me prior to noon. — 260

Nicholas Taylor (Nick) <NTaylor@somecorp.com> may be an intended recipient but was dropped from this thread — 280

Thanks very much.

Regards

Beth

-----Original Message-----
240 — From: Williams Jones (Bill) <WJones@somecorp.com>
To: Elizabeth Smith (Beth) <ESmith@somecorp.com>
Cc: Nicholas Taylor (Nick) <NTaylor@somecorp.com> — 250
Date: January 23, 2012 01:44PM
Subject: Drawings

230 —

Beth,
The subject drawings are attached for your review. Please look them over and let me know if anything was missed or if changes are required, thanks.

Bill

RECIPIENT CHANGES IN EMAIL THREADS

TECHNICAL FIELD

The present invention relates generally to electronic mail, and more specifically to tracking and notification of recipient changes in electronic mail threads.

BACKGROUND

Electronic mail (email) is a widely used format to communicate over the Internet. The use of email is commonplace for personal and business use. Individuals use email to communicate with other users. Additionally, electronic documents can be attached to and sent with the email messages.

Email may be exchanged between clients via servers. The servers play a role that may include both enhanced functionality and storage for email messages and any attached files.

In one method for transferring email messages, an email program may reside in part on a user's computer. The user drafts the email message on the user's computer (including entry of at least one recipient address in an address field and entry of a body of the email) and the email program replicates the message (i.e., copies, uploads) to an email server computer, which may sometimes be provided by an Internet Service Provider (ISP). The email message is subsequently replicated (i.e., copied, downloaded) to a recipient's computer, from the email server computer.

Another common technique for sending and receiving email messages is for an email program to operate primarily at the server computer. For example, in a web-based email program (webmail) a client may access the server computer and draft an email message in a user interface operating on the client computer. Upon "sending" the email message, the server computer stores the email message in association with the recipient. In web-based email programs, a copy is not typically stored on the client computer. The recipient may access the server computer from a client computer and view the email message in a user interface on the client computer. The email message need not be stored on the recipient client computer. Some email programs are capable of both techniques at a user's discretion.

An email messaging program (e.g., an electronic mail program) typically includes or has access to a directory of recipient addresses, which may be on a local client computer or on a server computer. In a business environment, the directory typically includes the recipient addresses of all employees in the same company.

An email messaging program generally has the ability to organize email messages into threads. An email thread (or simply "thread") is a group of email messages all relating to a single topic. There are different ways in which an email message can be identified as belonging to a thread. The email messaging program could look for matching subject lines of messages. Another way in which a message could be identified as belonging to a thread would be by use of a unique identifier present in each message belonging to the thread. Such an identifier need not be found in the subject line portion of the message.

SUMMARY

Aspects of one embodiment of the present invention disclose a method, system, and a program product for notifying a recipient of an email message that one or more other designated recipients of the email message have been changed from designated recipients of one or more previous email messages related to the email message. The method comprises a computer system receiving an email message belonging to a chain of related email messages and the computer system comparing recipient addresses in the email message to recipient addresses of a most recent prior email message belonging to the chain of related email messages to determine one or more recipient addresses contained in either the email message but not the most recent prior email message or the most recent prior email message but not the email message. The method further comprises the computer system notifying the recipient of the email message of the one or more recipient addresses and the computer system storing the one or more recipient addresses in metadata of the email message.

BRIEF DESCRIPTION OF THE SEVERAL VIEWS OF THE DRAWINGS

FIG. 2 is an exemplary user interface to an email client program in accordance with one embodiment of the present invention.

DETAILED DESCRIPTION

The present invention will now be described in detail with reference to the figures.

Figure 1:
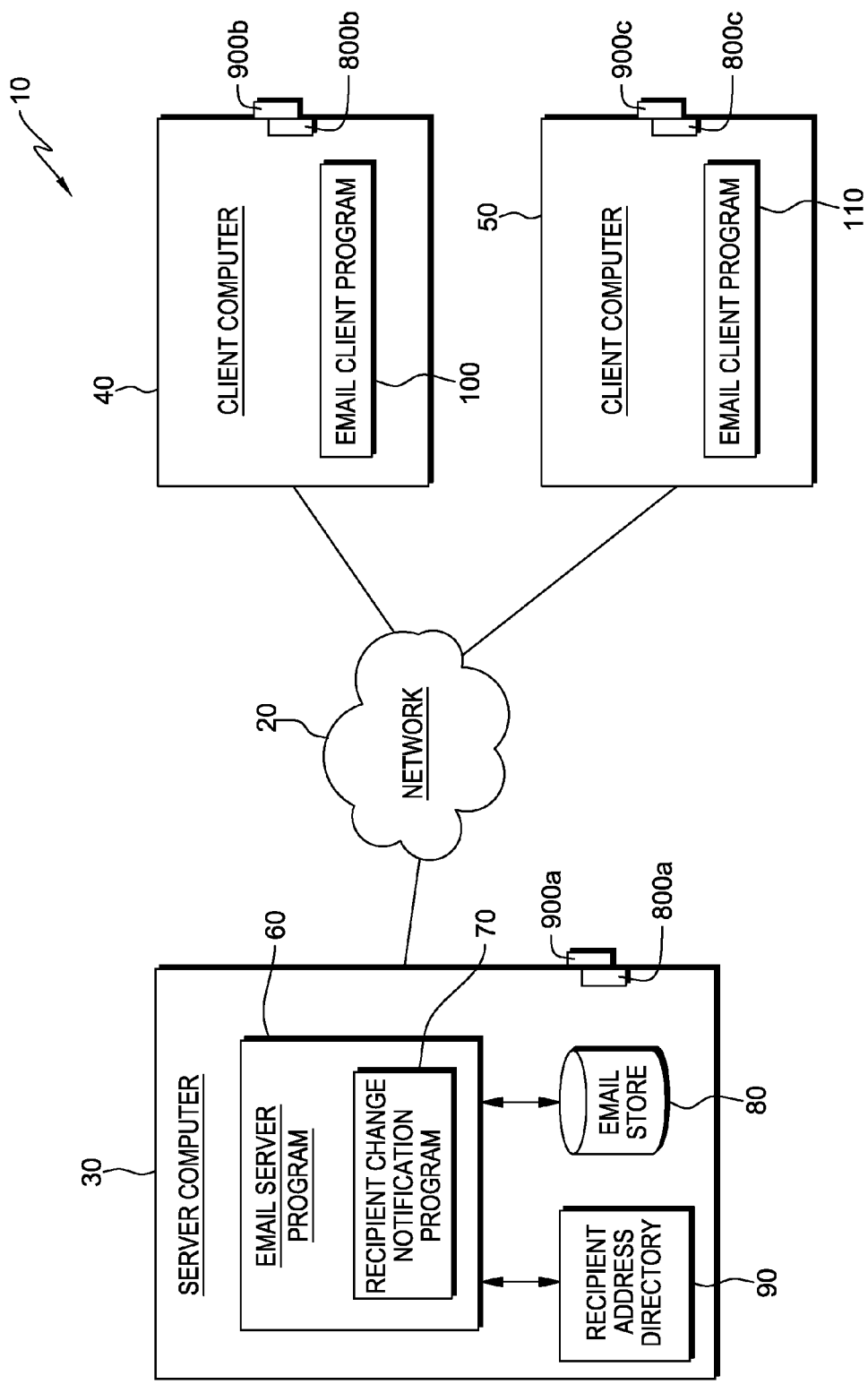
FIG. 1 depicts a diagram of a computing system in accordance with one embodiment of the present invention.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes server computer 30, client computer 40 and client computer 50 interconnected over network 20. Network 20 may be a local area network (LAN), a wide area network (WAN) such as the Internet, a combination of the two or any combination of connections and protocols that will support communications between server computer 30, client computer 40 and client computer 50 in accordance with embodiments of the invention. Network 20 may include wired, wireless, or fiber optic connections. Computing system 10 may include additional server computers, client computers, or other devices not shown.

Server computer 30 may be a management server, a web server, or any other electronic device or computing system capable of receiving and sending data. In other embodiments, server computer 30 may represent a server computing system utilizing multiple computers as a server system, such as in a cloud computing environment. Server computer 30 contains email server program 60, recipient change notification program 70, email store 80, and recipient address directory 90.

Client computers 40 and 50 may be a desktop computer, laptop computer, tablet computer, personal digital assistant (PDA), or smart phone. In general, client computers 40 and 50 may be any electronic device or computing system capable of sending and receiving data, and communicating with server computer 30 over network 20. Email client programs 100 and 110, execute on client computers 40 and 50, respectively. Email client programs 100 and 110 may be dedicated client email programs, web browsers, or any programs that can communicate with email server program 60 and provide a user interface for composing and viewing email messages.

Email server program 60 operates to receive, forward, and manage email messages between client computer 40 and client computer 50. In one embodiment, email server program 60 stores all email messages it manages in email store 80. Email store 80 is a file that may be written and read by email server program 60. In other embodiments, email store 80 may be a database such as an Oracle® database or an IBM® DB2® database.

Email server program 60 also executes recipient change notification program 70 to notify the recipient of an email message, belonging to an email thread, that another recipient address has been added to or dropped from the thread. Recipient change notification program 70 may notify the recipient of recipient addresses added or dropped between any two consecutive email messages in the thread.

In one embodiment, recipient change notification program 70 compares the address fields of an email message received to the address fields of the most recent prior email message in the thread. Recipient change notification program 70 stores recipient address that are determined to be added or dropped in the metadata of the email message received so the added or dropped recipient addresses can be accessed to notify recipients of subsequent emails in the email thread.

In another embodiment, recipient change notification program 70 also operates to notify the recipient of an email message if a person mentioned in the email message has been dropped from the email thread. Recipient change notification program 70 scans the email message for names or nicknames of possible intended recipients that correspond to recipient addresses in recipient address directory 90. Recipient change notification program 70 notifies the recipient of the name of a possible intended recipient who has been dropped from the email thread.

Recipient address directory 90 contains a list of names and their associated recipient addresses. In one embodiment, if the email thread is in the corporate setting, recipient address directory 90 lists all the employees of the corporation along with possible nicknames and recipient addresses. In one embodiment, recipient address directory 90 is located on server computer 30. In another embodiment, recipient address directory 90 may be located on another server, client computer 40, client computer 50, or any computing system as long as it is accessible to email server program 60.

Server computer 30 and client computers 40 and 50, each maintain respective internal components 800a, 800b, and 800c, and respective external components 900a, 900b, and 900c. In general, server computer 30 and client computers 40 and 50 can be any computing system as described in further detail with respect to FIG. 4.

FIG. 2 is an exemplary user interface to email client program 100 or 110 in accordance with one embodiment of the present invention. User interface 200 is an interface that allows a user to compose and view email messages. User interface 200 is displaying an email thread as received by recipient William Jones. Two email messages, emails 210 and 230, represent the email thread. Email 230 represents the email message sent by William Jones and email 210 represents the email message sent by Elizabeth Smith in reply to email 230. When William Jones received email 210, notification 270 notified him that recipient 250 was dropped from the email thread. Recipient 250 appears in address field 240 of email 230 but does not appear in address field 220 of email 210.

Also, when William Jones received email 210 notification 280 notified him that recipient 250 is a possible intended recipient of email 210 but was dropped from the email thread. Recipient 250 is a possible intended recipient because recipient 250 was referred to by name 260 in email 210. Name 260 may be a name or nickname expressly associated with recipient 250 (e.g., Nicholas or Nick for Nicholas Taylor). Notification 270 and notification 280 may be in the form of text entered directly in to emails 210 and 230 or popup windows.

Figure 3:
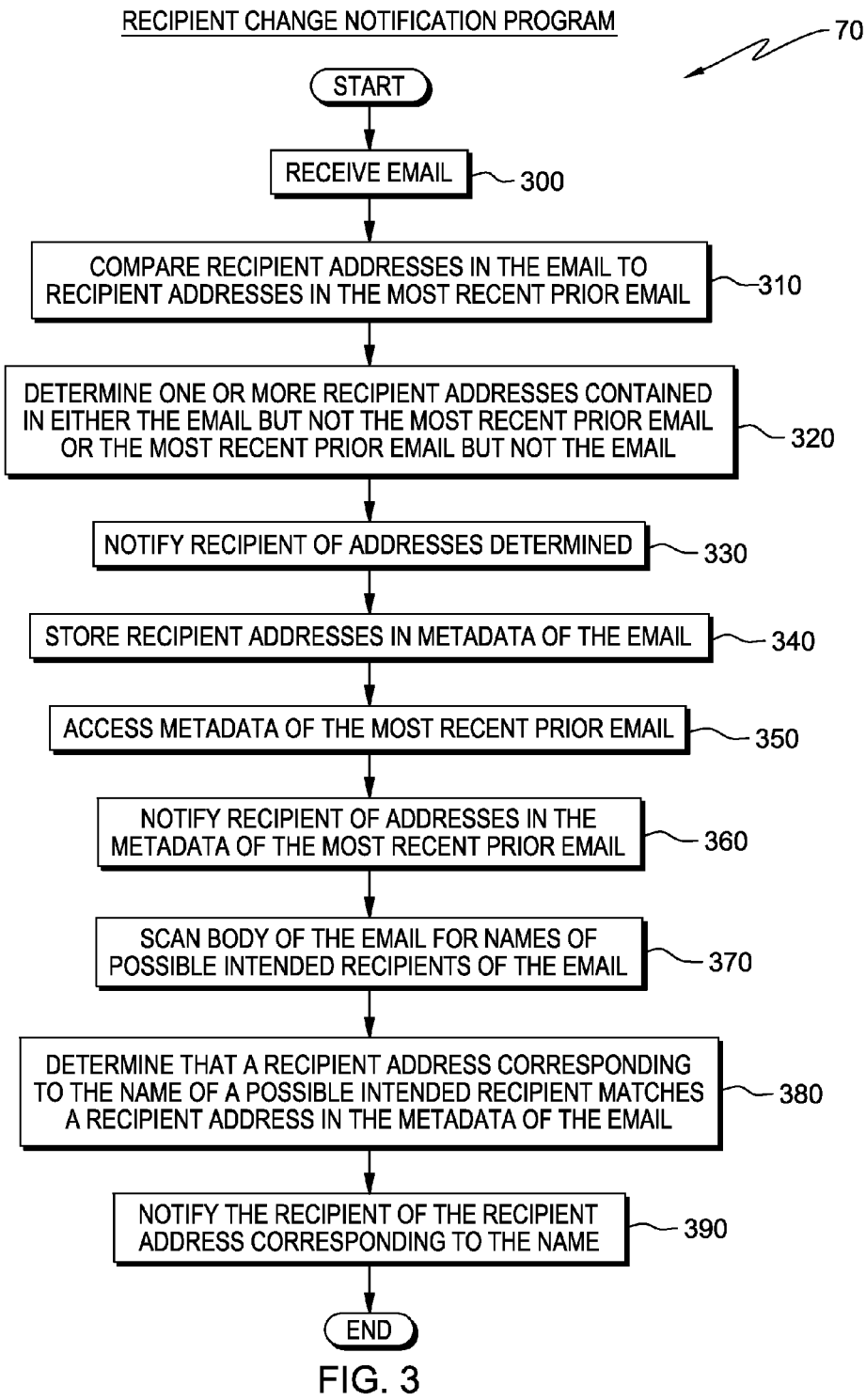
FIG. 3 depicts a flowchart of the steps of a recipient change notification program executing within the server computer of FIG. 1, for notifying the recipient of an email message, belonging to an email thread, that another recipient address has been added to or dropped from the thread, in accordance with one embodiment of the present invention.

FIG. 3 depicts a flowchart of the steps of recipient change notification program 70 executing within the computing system of FIG. 1, for notifying the recipient of an email message, belonging to an email thread, that another recipient address has been added to or dropped from the thread, in accordance with one embodiment of the present invention.

Initially, a user at client computer 40 composes an email message, including entry of at least one recipient address in the address field and entry of a body of the email, using email client program 100. The email message belongs to an email thread and is not the initial email message in the email thread. An email thread is a group of email messages all relating to a single topic. For example, an original email message and a reply email message to that original email message are email messages belong to an email thread. In one embodiment, email client program 100 is a dedicated client email program that sends the email message to email server program 60 over network 20. In another embodiment, email client program 100 is a web browser that allows a user to access email server program 60 and draft an email message in a user interface operating on client computer 40.

In step 300, recipient change notification program 70 receives the email message, belonging to the email thread, from email server program 60. In another embodiment, recipient change notification program 70 receives the email message directly from email client program 100 over network 20.

Recipient change notification program 70 compares the recipient addresses in the email message received with the recipient addresses in the most recent prior email message in the email thread (step 310). In one embodiment, recipient change notification program 70 queries email store 80 to fetch the most recent prior email message in the email thread to compare the recipient addresses in the address field of the email message received with the recipient addresses in the address field of the most recent prior email message. The address field may comprise the "to" field, the "carbon copy" field, the "blind carbon copy" field, or the "from" field of an email message. Email messages in the email thread are stored in email store 80. In another embodiment, recipient change notification program 70 receives, from email server program 60, the most recent prior email message in the email thread along with the email message.

In step 320, recipient change notification program 70 determines one or more recipient addresses contained in either the email message but not the most recent prior email message or the most recent prior email message but not the email message.

Recipient change notification program 70 notifies the recipient of the email message of the one or more recipient addresses contained in either the email message but not the most recent prior email message or the most recent prior email message but not the email message (step 330). In one embodiment, recipient change notification program 70 sends the email message, containing a notification of the one or more recipient addresses, to email client program 110 over network 20. The notification may be in the form of text entered directly in to the email message or in the form of a popup window to be displayed by email client program 110. The notification may also be displayed in the "to" field, the "carbon copy" field, or the "blind carbon copy" field of the email message as text highlighted in a particular color. For example, a recipient address that has been dropped will be shown highlighted in red and a recipient address that has been added will be shown highlighted in green. A user at client computer 50 may view the email message and the notification using email client program 110. In another embodiment, recipient change notification program 70 sends the email message, containing the notification, to email server program 60 which then sends the email message, containing the notification, to email client program 110 over network 20.

In step 340, recipient change notification program 70 stores the one or more recipient addresses, contained in either the email message but not the most recent prior email message or the most recent prior email message but not the email message, in the metadata of the email message. In one embodiment, if a recipient address is contained in the email message but not the most recent prior email message it is considered added and if a recipient address is contained in the most recent prior email message but not the email message if is considered dropped. Recipient change notification program 70 stores the recipient addresses and tags them as added or dropped in the metadata of the email message. In another embodiment, recipient change notification program 70 stores the email message in email store 80 after recipient change notification program 70 stores the recipient addresses and tags them as added or dropped in the metadata of the email message.

Recipient change notification program 70 accesses the metadata of the most recent prior email message (step 350). In one embodiment, recipient change notification program 70 queries email store 80 to fetch the most recent prior email message in the email thread. Recipient change notification program 70 searches the metadata of the most recent prior email message for recipient addresses tagged as added or dropped.

Recipient change notification program 70 notifies the recipient of the email message of the one or more recipient addresses contained in the metadata of the most recent prior email message (step 360). In one embodiment, recipient change notification program 70 sends the email message, containing a notification of the one or more recipient addresses added or dropped, to email client program 110 over network 20. The notification may be in the form of text entered directly in to the email message or in the form of a popup window to be displayed by email client program 110.

In one embodiment, steps 370, 380 and 390 are optional. In step 370, recipient change notification program 70 scans the email message for names of possible intended recipients of the email message. In one embodiment, recipient change notification program 70 scans the body of the email message for names or nicknames of possible intended recipients that correspond to recipient addresses in recipient address directory 90. A name or nickname that corresponds to a recipient address in recipient address directory 90 is considered a possible intended recipient of the email message.

In step 380, recipient change notification program 70 determines whether a recipient address corresponding to the name of a possible intended recipient matches a recipient address in the metadata of the email address. In one embodiment, recipient change notification program 70 accesses the metadata of the email message stored in step 340 and compares the recipient addresses in the metadata with the recipient address corresponding to the name of a possible intended recipient. In another embodiment, recipient change notification program 70 queries email store 80 to fetch the email message to access the metadata containing the recipient addresses stored in step 340.

In step 390, recipient change notification program 70 notifies the recipient of the email message of the recipient address corresponding to the name of a possible intended recipient that matches a recipient address in the metadata of the email message tagged as dropped from the email thread. In one embodiment, recipient change notification program 70 sends the email message, containing a notification of the recipient address corresponding to the name of a possible intended recipient that matches a recipient address in the metadata of the email message tagged as dropped, to email client program 110 over network 20. The notification may be in the form of text entered directly in to the email message or in the form of a popup window to be displayed by email client program 110.

Figure 4:
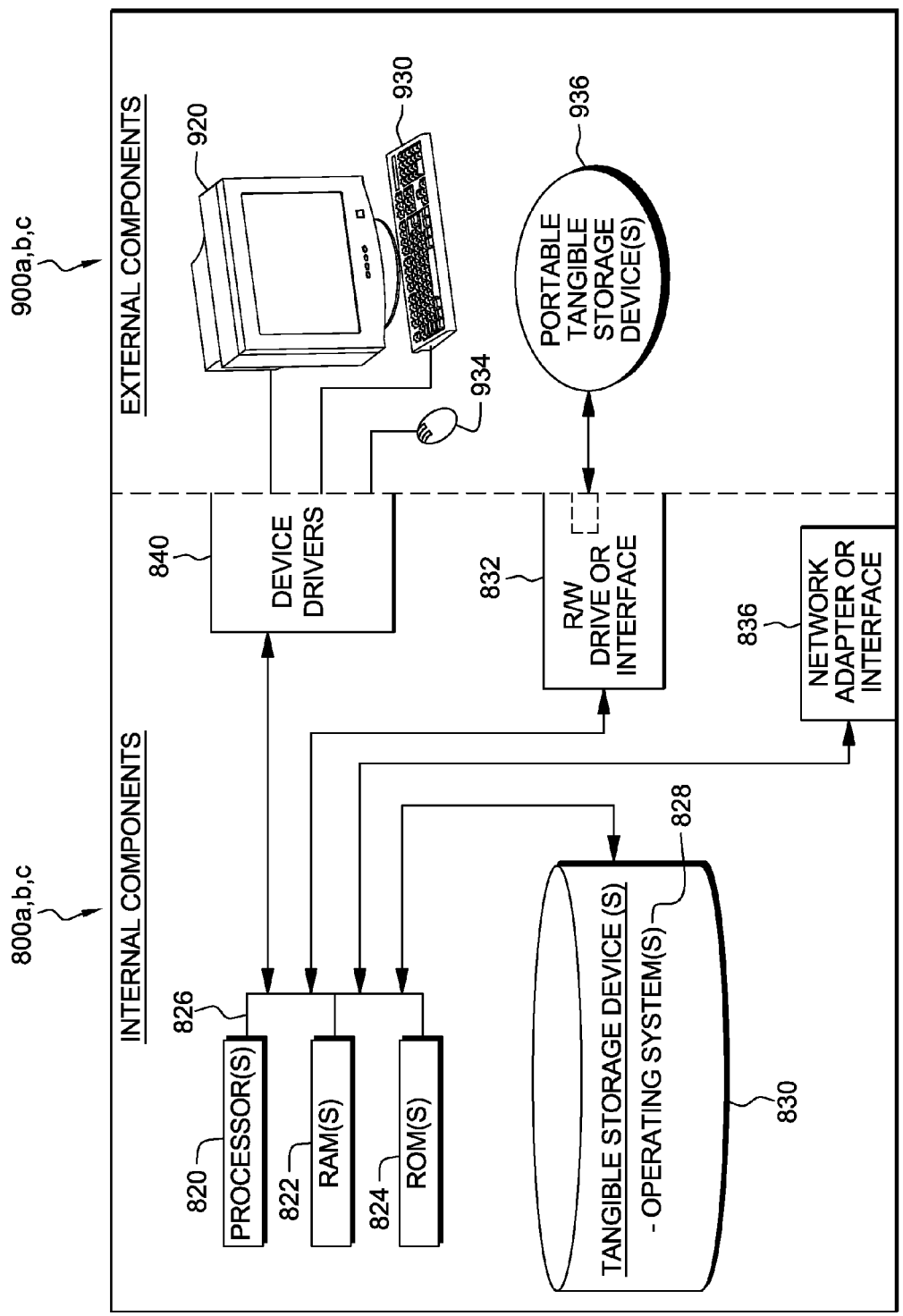
FIG. 4 is a block diagram of internal and external components of the server computer and the client computers of FIG. 1 in accordance with one embodiment of the present invention.

FIG. 4 is a block diagram of internal and external components of server computer 30 and client computers 40 and 50 in accordance with one embodiment of the present invention.

Server computer 30 and client computers 40 and 50 include respective sets of internal components 800*a,b,c* and external components 900*a,b,c*. Each of the sets of internal components 800*a,b,c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, email server program 60, recipient change notification program 70, email store 80, and recipient address directory 90 are stored on one or more of computer-readable tangible storage devices 830 of internal components 800*a* for execution by one or more of processors 820 of internal components 800*a* via one or more of RAMs 822 of internal components 800*a* (which typically include cache memory). The one or more operating systems 828 and email client program 100 are stored on one or more of computer-readable tangible storage devices 830 of internal components 800*b* for execution by one or more of processors 820 of internal components 800*b* via one or more of RAMs 822 of internal components 800*b* (which typically include cache memory). The one or more operating systems 828 and email client program 110 are stored on one or more of computer-readable tangible storage devices 830 of internal components 800*c* for execution by one or more of processors 820 of internal components 800*c* via one or more of RAMs 822 of internal components 800*c* (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a,b,c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Email server program 60, recipient change notification program 70, email store 80, and recipient address directory 90 can be stored on one or more of portable computer-readable tangible storage devices 936 of external components 900*a*, read via R/W drive or interface 832 of internal components 800a and loaded into computer-readable tangible storage devices 830 of internal components 800a. Email client program 100 can be stored on one or more of portable computer-readable tangible storage devices 936 of external components 900b, read via R/W drive or interface 832 of internal components 800b and loaded into computer-readable tangible storage devices 830 of internal components 800b. Email client program 110 can be stored on one or more of portable computer-readable tangible storage devices 936 of external components 900c, read via R/W drive or interface 832 of internal components 800c and loaded into computer-readable tangible storage devices 830 of internal components 800c.

Each set of internal components 800a,b,c also includes a network adapter or interface 836 such as a TCP/IP adapter card. Email server program 60, recipient change notification program 70, email store 80, and recipient address directory 90 can be downloaded to server computer 30 from an external computer via a network (such as network 20) and network adapter or interface 836 of internal components 800a. From the network adapter or interface 836 of internal components 800a, email server program 60, recipient change notification program 70, email store 80, and recipient address directory 90 are loaded into computer-readable tangible storage devices 830 of internal components 800a. Email client program 100 can be downloaded to client computer 40 from an external computer via a network (such as network 20) and network adapter or interface 836 of internal components 800b. From the network adapter or interface 836 of internal components 800b, email client program 100 is loaded into computer-readable tangible storage devices 830 of internal components 800b. Email client program 110 can be downloaded to client computer 50 from an external computer via a network (such as network 20) and network adapter or interface 836 of internal components 800c. From the network adapter or interface 836 of internal components 800c, email client program 110 is loaded into computer-readable tangible storage devices 830 of internal components 800c. The network may comprise copper wires, optical fibers, wireless transmission, routers, firewalls, switches, gateway computers and/or edge servers.

Each of the sets of external components 900 a,b,c can include a computer display monitor 920, a keyboard 930, and a computer mouse 934. External components 900 a,b,c can also include touch screens, virtual keyboards, touch pads, pointing devices, and other human interface devices. Each of the sets of internal components 800 a,b,c also includes device drivers 840 to interface to computer display monitor 920, keyboard 930 and computer mouse 934. Device drivers 840, R/W drive or interface 832 and network adapter or interface 836 comprise hardware and software (stored in storage device 830 and/or ROM 824).

Email server program 60, recipient change notification program 70, email store 80, recipient address directory 90, email client program 100, and email client program 110 can be written in various programming languages (such as Java, C++) including low-level, high-level, object-oriented or non object-oriented languages. Alternatively, the functions of email server program 60, recipient change notification program 70, email store 80, recipient address directory 90, email client program 100, and email client program 110 can be implemented in whole or in part by computer circuits and other hardware (not shown).

Based on the foregoing, a computer system, a method and a program product have been disclosed for notifying the recipient of an email message, belonging to an email thread, that another recipient address has been added to or dropped from the thread. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for notifying a recipient of an email message that one or more other designated recipients of the email message have been changed from designated recipients of one or more previous email messages related to the email message, the method comprising the steps of:
   a computer system receiving an email message belonging to a chain of related email messages;
   the computer system comparing recipient addresses in the email message to recipient addresses of a most recent prior email message belonging to the chain of related email messages to determine one or more recipient addresses contained in either the email message but not the most recent prior email message or the most recent prior email message but not the email message;
   the computer system notifying a recipient of the email message of the one or more recipient addresses;
   the computer system storing the one or more recipient addresses in metadata of the email message; and
   the computer system accessing metadata of the most recent prior email message to notify the recipient of one or more recipient addresses in the metadata of the most recent prior email message, wherein the one or more recipient addresses in the metadata of the most recent prior email message are one or more recipient addresses contained in either the most recent prior email message but not an email message sequentially before the most recent prior email message or the email message sequentially before the most recent prior email message but not the most recent prior email message.

2. The method of claim 1, further comprising the steps of:
   the computer system receiving a subsequent email message belonging to the chain of related email messages;
   the computer system comparing recipient addresses in the subsequent email message to recipient addresses of the email message to determine one or more recipient addresses contained in either the subsequent email message but not the email message or the email message but not the subsequent email message;
   the computer system notifying a recipient of the subsequent email message, of the one or more recipient addresses contained in either the subsequent email message but not the email message or the email message but not the subsequent email message;
   the computer system storing the one or more recipient addresses in metadata of the subsequent email message; and
   the computer system accessing metadata of the email message to notify the recipient of the subsequent email message of one or more recipient addresses in the metadata of the email message.

3. The method of claim 1, further comprising the steps of:
   the computer system scanning a body portion of the email message for one or more names of possible intended recipients of the email message, wherein the one or more names correspond to one or more respective recipient addresses in a directory of recipient addresses; and
   the computer system determining whether a recipient address corresponding to one of the one or more names matches one of the one or more recipient addresses in the metadata of the email message, wherein the one or more recipient addresses in the metadata of the email message is indicated as a recipient address that has been dropped.

4. The method of claim 3, further comprising the step of the computing system, in response to determining that the recipient address corresponding to one of the one or more names matches one of the one or more recipient addresses in the metadata of the email message, notifying the recipient of the email message of the recipient address corresponding to the one of the one or more names.

5. The method of claim 3, further comprising the steps of the computer system determining whether a second recipient address corresponding to one of the one or more names matches one of the one or more recipient addresses in the metadata of the most recent prior email message, wherein the one or more recipient addresses in the metadata of the most recent prior email message is indicated as a recipient address that has been dropped.

6. The method of claim 5, further comprising the step of the computer system, in response to determining that the second recipient address corresponding to one of the one or more names matches one of the one or more recipient addresses in the metadata of the most recent prior email message, notifying the recipient of the email message of the recipient address corresponding to the one of the one or more names.

7. The method of claim 1, wherein a recipient address is located in a to field, a carbon copy field, a blind carbon copy field, a from field or any combination thereof, of the email message.

8. The method of claim 1, wherein the notification includes recipient addresses in the email message but not the most recent prior email message notified in a first color and recipient addresses in the most recent prior email message but not the email message notified in a second color.

9. A computer program product for notifying a recipient of an email message that one or more other designated recipients of the email message have been changed from designated recipients of one or more previous email messages related to the email message, the computer program product comprising:
one or more computer-readable tangible storage devices and program instructions stored on at least one of the one or more storage devices, the program instructions comprising:
program instructions to receive an email message belonging to a chain of related email messages;
program instructions to compare recipient addresses in the email message to recipient addresses of a most recent prior email message belonging to the chain of related email messages to determine one or more recipient addresses contained in either the email message but not the most recent prior email message or the most recent prior email message but not the email message;
program instructions to notify a recipient of the email message of the one or more recipient addresses;
program instructions to store the one or more recipient addresses in metadata of the email message; and
program instructions to access metadata of the most recent prior email message to notify the recipient of one or more recipient addresses in the metadata of the most recent prior email message, wherein the one or more recipient addresses in the metadata of the most recent prior email message are one or more recipient addresses contained in either the most recent prior email message but not an email message sequentially before the most recent prior email message or the email message sequentially before the most recent prior email message but not the most recent prior email message.

10. The computer program product of claim 9, further comprising program instructions, stored on at least one of the one or more storage devices, the program instructions comprising:
program instructions to scan a body portion of the email message for one or more names of possible intended recipients of the email message, wherein the one or more names correspond to one or more respective recipient addresses in a directory of recipient addresses; and
program instructions to determine whether a recipient address corresponding to one of the one or more names matches one of the one or more recipient addresses in the metadata of the email message, wherein the one or more recipient addresses in the metadata of the email message is indicated as a recipient address that has been dropped.

11. The computer program product of claim 10 further comprising program instructions, stored on at least one of the one or more storage devices, in response to program instructions to determine that the recipient address corresponding to one of the one or more names matches one of the one or more recipient addresses in the metadata of the email message, program instructions to notify the recipient of the email message of the recipient address corresponding to the one of the one or more names.

12. The computer program product of claim 10 further comprising program instructions, stored on at least one of the one or more storage devices, to determine whether a second recipient address corresponding to one of the one or more names matches one of the one or more recipient addresses in the metadata of the most recent prior email message, wherein the one or more recipient addresses in the metadata of the most recent prior email message is indicated as a recipient address that has been dropped.

13. The computer program product of claim 12 further comprising program instructions, stored on at least one of the one or more storage devices, in response to program instructions to determine that the second recipient address corresponding to one of the one or more names matches one of the one or more recipient addresses in the metadata of the most recent prior email message, program instructions to notify the recipient of the email message of the recipient address corresponding to the one of the one or more names.

14. The computer program product of claim 9 wherein a recipient address is located in a to field, a carbon copy field, a blind carbon copy field, a from field or any combination thereof, of the email message.

15. The computer program product of claim 9 further comprising program instructions, stored on at least one of the one or more storage devices, the program instructions comprising:
program instructions to receive a subsequent email message belonging to the chain of related email messages;
program instructions to compare recipient addresses in the subsequent email message to recipient addresses of the email message to determine one or more recipient addresses contained in either the subsequent email message but not the email message or the email message but not the subsequent email message;
program instructions to notify a recipient of the subsequent email message, of the one or more recipient addresses contained in either the subsequent email message but not the email message or the email message but not the subsequent email message;
program instructions to store the one or more recipient addresses in metadata of the subsequent email message; and program instructions to access metadata of the email message to notify the recipient of the subsequent email message of one or more recipient addresses in the metadata of the email message.

16. The computer program product of claim 9, wherein the notification includes recipient addresses in the email message but not the most recent prior email message notified in a first color and recipient addresses in the most recent prior email message but not the email message notified in a second color.

17. A computer system for notifying a recipient of an email message that one or more other designated recipients of the email message have been changed from designated recipients of one or more previous email messages related to the email message, the computer system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
program instructions to receive an email message belonging to a chain of related email messages;
program instructions to compare recipient addresses in the email message to recipient addresses of a most recent prior email message belonging to the chain of related email messages to determine one or more recipient addresses contained in either the email message but not the most recent prior email message or the most recent prior email message but not the email message;
program instructions to notify a recipient of the email message of the one or more recipient addresses;
program instructions to store the one or more recipient addresses in metadata of the email message; and
program instructions to access metadata of the most recent prior email message to notify the recipient of one or more recipient addresses in the metadata of the most recent prior email message, wherein the one or more recipient addresses in the metadata of the most recent prior email message are one or more recipient addresses contained in either the most recent prior email message but not an email message sequentially before the most recent prior email message or the email message sequentially before the most recent prior email message but not the most recent prior email message.

18. The computer system of claim 17, further comprising program instructions, stored on at least one of the one or more storage devices for execution by at least one of the one or more processors via at least one of the one or more memories, the program instructions comprising:
program instructions to scan a body portion of the email message for one or more names of possible intended recipients of the email message, wherein the one or more names correspond to one or more respective recipient addresses in a directory of recipient addresses; and
program instructions to determine whether a recipient address corresponding to one of the one or more names matches one of the one or more recipient addresses in the metadata of the email message, wherein the one or more recipient addresses in the metadata of the email message is indicated as a recipient address that has been dropped.

19. The computer system of claim 18 further comprising program instructions, stored on at least one of the one or more storage devices for execution by at least one of the one or more processors via at least one of the one or more memories, in response to program instructions to determine that the recipient address corresponding to one of the one or more names matches one of the one or more recipient addresses in the metadata of the email message, program instructions to notify the recipient of the email message of the recipient address corresponding to the one of the one or more names.

20. The computer system of claim 17, wherein the notification includes recipient addresses in the email message but not the most recent prior email message notified in a first color and recipient addresses in the most recent prior email message but not the email message notified in a second color.

\* \* \* \* \*